June 7, 1938. R. A. YOUNG 2,119,764
FASTENING DEVICE
Filed April 10, 1937

INVENTOR.
ROYAL A. YOUNG
BY
ATTORNEY.

Patented June 7, 1938

2,119,764

UNITED STATES PATENT OFFICE 2,119,764

FASTENING DEVICE

Royal A. Young, Walsh, Colo.

Application April 10, 1937, Serial No. 136,107

5 Claims. (Cl. 85—5)

This invention relates to a fastening device, and has for its principal object, the provision of a fastener which can be used in place of rivets or screws or similar articles to fasten members together; which will be quickly attachable; and which, after it is in place, can never be removed without completely destroying the fastening device.

It will be found useful for attaching seals to meters, car doors, etc., where it is desired to make a permanent attachment which can not be detached without detection. Other uses are to attach license plates or drivers' permits to automobiles; reflecting jewels to road signs; buttons, emblems or jewels to clothing; etc.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Figure 1:
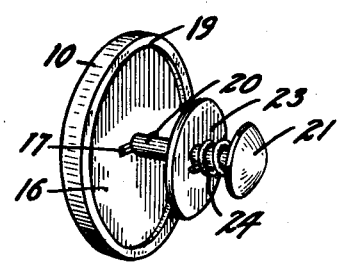
Fig. 1 is a rear perspective view of one form of the fastening device.
Figures 2, 3, 4, 5:
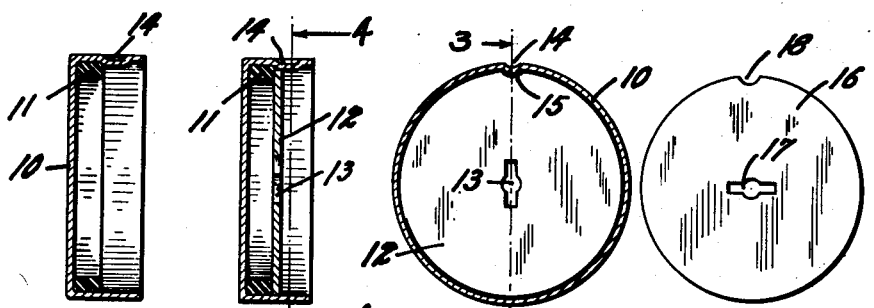
Fig. 2 is a cross section through the housing, before assembling.
Fig. 3 is a similar section, taken on the line 3—3, Fig. 4, illustrating the spring locking plate in place in the housing.
Fig. 4 is a section, taken on the line 4—4, Fig. 3, illustrating a face view of the spring locking plate.
Fig. 5 is a face view of the rear face plate.

The invention comprises a cup-like housing 10 containing a spacing washer 11 preferably of rubber or similar resilient material. A locking plate 12 rests against the washer 11. The plate 12 is formed from spring steel or spring brass or similar resilient material and contains a central opening or slot 13. An identation 14 in the housing 10 fits into a notch 15 in the plate 12 to prevent the latter from rotating in the housing.

A rear face plate 16 is placed in the housing against the locking plate 12. The face plate 16 contains an elongated opening or slot 17 at its middle similar to the opening 13, except that the opening 17 extends in a direction at right angles to the length of the opening 13. A notch 18 is also formed in the face plate 16 for engaging the indentation 14 to prevent rotation of the rear face plate. After the two plates are in position, the edge of the housing is rolled over, as shown at 19 to lock them permanently in place and form the complete housing assembly of Fig. 6.

The shank portion of the device consists of a shaft 20 having a head 21 at one extremity, and oppositely projecting prongs 22 at its other extremity. A disc 23 is mounted on the shank 20 and a compression spring 24 is positioned between the disc 23 and the head 21.

Figures 6, 7, 8:
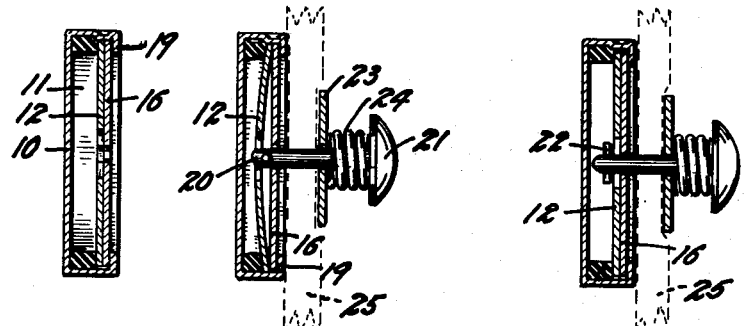
Fig. 6 is a section through the finished housing.
Fig. 7 is a section illustrating the first step in assembling the complete device.
Fig. 8 is a similar section illustrating the final step.

In Figs. 7 and 8, a supporting member is indicated at 25 in broken line. Let us assume that it is desired to attach the fastening device to the member 25. The housing assembly is positioned on one side of the member 25 and the shank portion on the other side thereof. The shaft 20 is now forced through the member 25 until its extremity enters the center of the opening 17. It is now rotated until the prongs 22 also enter the slot 17 of the face plate. After passing through this slot, the prongs contact the surface of the locking plate 12. Pressure upon the head 21 now causes the prongs to bow or spring this plate inwardly, as shown in Fig. 7, so that the prongs may be rotated between two plates until they reach the position of the slot 13. This allows the plate 12 to snap back against the plate 16, and allows the extremity of the shaft 20 to pass completely into the housing 10, as shown in Fig. 8.

The spring 24 is now under compression so as to hold the fastening device snugly engaged to the supporting member 25. The spring 24 also acts to automatically accommodate articles of various thicknesses between the disc 23 and the housing 10.

Figures 9, 10:
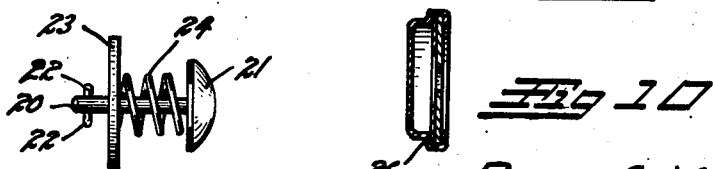
Fig. 9 is a detail view of the shank portion of the fastener.
Fig. 10 illustrates an alternate form of housing for the fastening device.

While one form of the device has been illustrated, it is understood that this form may be varied, for instance, instead of using the spacing washer 11, the housing 10 could be indented with a ring-like indentation 26 to hold the plate 12 spaced from the rear of the housing, as shown in Fig. 10. This form would depend entirely upon the resiliency of the plate 12 for its action.

In both forms of the device the face plate 16 is formed either of non-resilient material, that is, material which will either permanently bend or break should an attempt be made to pull the prongs outward through the slot 18 against the plate 16, or the plate could be sufficiently strong and non-yielding to shear off the prongs 22 should an attempt be made to remove the stem by force. In either case the fastener would be destroyed so that unauthorized removal could be easily detected.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A fastening device comprising: a supporting member; a perforated resilient plate mounted in said supporting member; a second perforated plate mounted in said supporting member and covering said resilient plate; a shaft; a head on one extremity of said shaft; prongs projecting oppositely outward from adjacent the other extremity of said shaft, each of said plates being perforated for the passage of said shaft, each of the perforations having oppositely extending slots for the passage of said prongs, the slots in said resilient plate being out of alignment with the slots in said second plate.

2. A fastening device comprising: a supporting member; a perforated resilient plate mounted in said supporting member; a second perforated plate mounted in said supporting member and covering said resilient plate; a shaft; a head on one extremity of said shaft; prongs projecting oppositely outward from adjacent the other extremity of said shaft, each of said plates being perforated for the passage of said shaft, each of the perforations having oppositely extending slots for the passage of said prongs, the slots in said resilient plate being out of alignment with the slots in said second plate so that when said prongs pass through said second plate they will contact said resilient plate and flex the latter to allow the prongs to turn between the two plates.

3. A fastening device comprising: a supporting member; a perforated resilient plate mounted in said supporting member; a second perforated plate mounted in said supporting member and covering said resilient plate; a shaft; a head on one extremity of said shaft; prongs projecting oppositely outward from adjacent the other extremity of said shaft, each of said plates being perforated for the passage of said shaft, each of the perforations having oppositely extending slots for the passage of said prongs, the slots in said resilient plate being out of alignment with the slots in said second plate; a disc-like member on said shaft; and a spring compressed between said latter member and said head.

4. A fastener comprising: a cup-like housing; a spring plate in said housing spaced from the bottom thereof; a face plate resting against said spring plate; means for holding said two plates together in said housing; means for preventing both plates from rotating in said housing; a headed shank member; oppositely projecting fangs at one extremity of said shank member, said two plates being perforated with elongated openings for the passage of said fangs, the elongated opening in said face plate being positioned out of alignment with the elongated opening in said spring plate.

5. A fastener comprising: a cup-like housing; a spring plate in said housing spaced from the bottom thereof; a face plate resting against said spring plate; means for holding said two plates together in said housing; means for preventing both plates from rotating in said housing; a headed shank member; oppositely projecting fangs at one extremity of said shank member, said two plates being perforated with elongated openings for the passage of said fangs, the elongated opening in said face plate being positioned out of alignment with the elongated opening in said spring plate; a pressure disc surrounding said shank; and a spring acting to force said pressure disc toward said housing.

ROYAL A. YOUNG.